(12) United States Patent
Sarpatwar et al.

(10) Patent No.: US 12,041,157 B2
(45) Date of Patent: Jul. 16, 2024

(54) EFFICIENTLY BATCHING PRE-ENCRYPTED DATA FOR HOMOMORPHIC INFERENCE

(71) Applicant: International Business Machines Corporation, Armonk, NY (US)

(72) Inventors: Kanthi Sarpatwar, Elmsford, NY (US); Roman Vaculin, Larchmont, NY (US); Ehud Aharoni, Kfar Saba (IL); James Thomas Rayfield, Ridgefield, CT (US); Omri Soceanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 17/315,433

(22) Filed: May 10, 2021

(65) Prior Publication Data

US 2022/0376888 A1 Nov. 24, 2022

(51) Int. Cl.
*H04L 9/00* (2022.01)

(52) U.S. Cl.
CPC .......... *H04L 9/008* (2013.01); *H04L 2209/20* (2013.01)

(58) Field of Classification Search
None
See application file for complete search history.

(56) References Cited

U.S. PATENT DOCUMENTS

| | | | |
|---|---|---|---|
| 10,536,263 B2 | 1/2020 | Payton et al. | |
| 10,812,252 B2 | 10/2020 | Laine et al. | |
| 10,929,402 B1 | 2/2021 | Meng | |
| 11,308,234 B1* | 4/2022 | Stapleton | G06F 21/6245 |
| 2020/0104636 A1* | 4/2020 | Halevi | G06F 18/211 |
| 2021/0157932 A1* | 5/2021 | Blatt | H04L 9/0643 |

OTHER PUBLICATIONS

Sarpatwar Kanthi, Efficient Encrypted Inference on Ensembles of Decision Trees, Mar. 5, 2021, Pages All (Year: 2021).*
Hilder Vitor Lima Pereira, What is batching in homomorphic encryption, Nov. 13, 2020, Page All (Year: 2020).*
International Search Report and Written Opinion, PCT/EP2022/06267, Sep. 9, 2022.

(Continued)

*Primary Examiner* — Syed A Roni
(74) *Attorney, Agent, or Firm* — Edward J. Wixted, III (57) ABSTRACT

Privacy-preserving homomorphic inferencing utilizes batch processing on encrypted data records. Each data record has a private data portion of interest against which the inferencing is carried out. Batch processing is enabled with respect to a set of encrypted data records by techniques that ensure that each encrypted data record has its associated private data portion in a unique location relative to the other data records. The set of encrypted data records are then summed to generate a single encrypted data record against which the inferencing is done. In a first embodiment, the private data portions of interest are selectively and uniquely positioned at runtime (when the inferencing is being applied). In a second embodiment, the private data portions of interest are initially positioned with the data-at-rest, preferably in an off-line process; thereafter, at runtime individual encrypted data records are processed as necessary to adjust the private data portions to unique positions prior to batching.

9 Claims, 6 Drawing Sheets

(56) References Cited

OTHER PUBLICATIONS

Kim, et al., "HEAR: Human Action Recognition via Neural Networks on Homomorphically Encrypted Data," Cornell University Library, Cornell University, arXiv:2104.09164 [cs.CR], Apr. 19, 2021.
Doröz, et al. "On-the-fly Homomorphic Batching/Unbatching," International Conference on Financial Cryptography and Data Security, Springer, Berlin, Heidelberg, 2016.
Bost, et al., "Machine learning classification over encrypted data," NDSS '15, Feb. 2015.
Graepel, et al., "ML Confidential: Machine Learning on Encrypted Data," ICISC, 2012.
Han, et al., "Efficient logistic regression on large encrypted data," IACR Cryptology 2018.
Cheon, et al., "Ensemble method for privacy-preserving logistic regression based on homomorphic encryption," IEEE Access 2018.
Jaschke et al., "Unsupervised machine learning on encrypted data," SAC 2018.
Juvekar, et al., "Gazelle: A low latency framework for secure neural network inference," USENIX Security Symposium, 2018.

\* cited by examiner

INPUT: Given a set of pre-encrypted records $E^r(R_1), E^r(R_2), \cdots E^r(R_N)$
- OUTPUT: $E(R_1, R_2 \cdots R_N)$ IF $r_i = r_j$ (collision) then generate another random number $r_j'$ and shift $E^r(R_j)$ ←
shiftRotate($E^r(R_j), (r_j + r_j') \cdot d$)

- For $i \in [N]$:
  - $E \leftarrow$ add $(E, E^r(R_i))$
- Return $E$

```
PREPROCESSING:
• Pick P random integers r_1,r_2 ··· r_p in the range [M]
• For i ∈ [N]:

• E^r(R_1) ← shiftRotate(E(R_i),d · r_i)

• Return E^r(R_1), E^r(R_2), ··· E^r(R_p), also random numbers

• INPUT: given a set of pre-encrypted records E^r(R_1), E^r(R_2), ··· E^r(R_N)
• OUTPUT: E(R_1,R_2 ··· R_N)

• If r_i=r_j (collision) then generate another random number r_j' and
  shift E^r(R_j) ← shiftRotate(E^r(R_j),(r_j+r_j') · d)

• For i ∈ [N]:
    • E ← add (E,E^r(R_i))
• Return E
```

EFFICIENTLY BATCHING PRE-ENCRYPTED DATA FOR HOMOMORPHIC INFERENCE

BACKGROUND OF THE INVENTION

Technical Field

This disclosure relates generally to artificial intelligence-based (AI-based) privacy-preserving inferencing in a high throughput transaction processing environment.

Background of the Related Art

In applications such as credit card fraud detection, transactions arrive in real-time and must be scored against a high-accuracy machine learning model to detect frauds. User profile and other sensitive information (such as personal information and credit card information) used for the fraud detection is often "static" and stored in encrypted form in a row-wise fashion, typically one ciphertext per user. In this context, performing transaction-wise model scoring is infeasible due to the high volume (e.g., tens of thousands per second) that need to be handled. The problem is how to perform efficient transaction scoring, e.g., based on machine learning (ML) inferencing, in a way that combines runtime dynamically-encrypted transactional data (e.g., point of sale financial data) with statistically-encrypted data (e.g., user profiles. Handling transactions individually often is inefficient. While known art uses batching, these approaches assume that the input data is in the clear and that batching happens at encryption time, which is not feasible in the example use case (credit card fraud detection) because data is pre-encrypted offline (not at inferencing time).

While batching transactions together (i.e., near real-time setting) and performing single instruction multiple data (SIMD) type inference computation would significantly improve throughput in this operating scenario, there are several challenges, namely, the user information is pre-encrypted in a row-wise fashion, and the order of transactions is unknown.

As further background, Homomorphic Encryption (HE) is a form of encryption that allows computations to be carried out on ciphertext, thus generating an encrypted result which, when decrypted, matches the result of operations performed on the plaintext.

A homomorphic encryption scheme is a cryptosystem that allows computations to be performed on data without decrypting it. While an HE-based scheme might be useful to facilitate training of a ML model using encrypted user profile and card information, it is not possible to apply homomorphic inference directly on a high-accuracy model trained in such a manner due to the high transaction data volume itself.

BRIEF SUMMARY

This disclosure provides a method, apparatus and computer program product that enables efficient and secure, batched inference on pre-encrypted databases or data sets.

In an example use case, real-time transaction data is received at a detection system. A set of transactions in the transaction data is assumed to have been flagged, for example, as potentially fraudulent, and it is now desired to render a decision regarding whether particular transactions in the set should be classified definitively as fraudulent. In lieu of making this determination on an individual transaction basis, a batch-oriented solution is provided. In a first embodiment, real-time privacy-preserving inferencing is carried out for a set of transactions that have been identified in real-time during a time window. In this embodiment, and for each transaction in the set, an encrypted data record is obtained. Each encrypted data record has a same format (size) and a private data portion of interest (i.e., that will be used for the privacy-preserving inferencing). Typically, the private data portion of interest is user private of data. According to this embodiment, one or more transformations are then applied to each of the encrypted data records to generate a set of transformed encrypted data records each having the private data portion of interest at a unique position. The transformed encrypted data records are then added to generate a batched encrypted data record, wherein the batched encrypted data record includes the private data portions of interest from all of the transformed encrypted data records. Homomorphic inferencing in then performed on the batched encrypted data record. In response to the inferencing, one or more of the set of transactions are identified as having a given characteristic.

In a second embodiment, privacy-preserving inferencing is also carried but with respect to data records that are first pre-processed in an off-line manner. In this approach, and during a first data-at-rest phase, a set of data records are identified. Each data record has a private data portion of interest, which in this embodiment is the actual raw data (cleartext). One or more transformations are then applied to each of the data records to generate a set of encrypted data records each having the private data portion of interest at a position (which may or may not be unique relative to other data records). These encrypted data records are then stored back to complete the first phase. Thereafter, and during a second runtime phase, the following operations are carried out for a set of transactions that have been identified in real-time during a time window. In particular, the encrypted data records (generated during the off-line phase) that correspond to the set of transactions are obtained. Then, the position of the private data portion of interest is adjusted as necessary (in one or more of the encrypted data records) such that the set of transformed encrypted data records now each have the private data portion of interest at a unique position. At this point, the processing continues as in the first embodiment, namely, the encrypted data records are added to generate a batched encrypted data record, which then includes the private data portions of interest from all of the encrypted data records that have been obtained for the set of transactions. The homomorphic inferencing is then performed on the batched encrypted data record. In response, one or more of the set of transactions are identified as having the given characteristic.

Thus, in the first embodiment the batch processing (and associated inferencing) on the encrypted data records occurs in real-time; in contrast, in the second embodiment, the processing starts with the data-at-rest and even before the raw data itself is encrypted (or re-encrypted, as the case may be). Like the first embodiment, this processing is designed to alter the initial position of the private data portion of interest so that a set of encrypted data records can later be batch-processed into a (single) batched encrypted data record. This processing occurs off-line and, once encrypted, those records are then returned to their storage. During a subsequent runtime operation, relevant encrypted data records are then retrieved and further processed as necessary (i.e., to adjust the position(s) of the private data portion(s) so that none overlap) to facilitate the batch processing. In both embodiments, batch processing is carried out with respect to a single encrypted data record that comprises the private data portion(s) of interest from multiple individual encrypted data records, thereby providing significant throughput efficiencies while preserving privacy.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
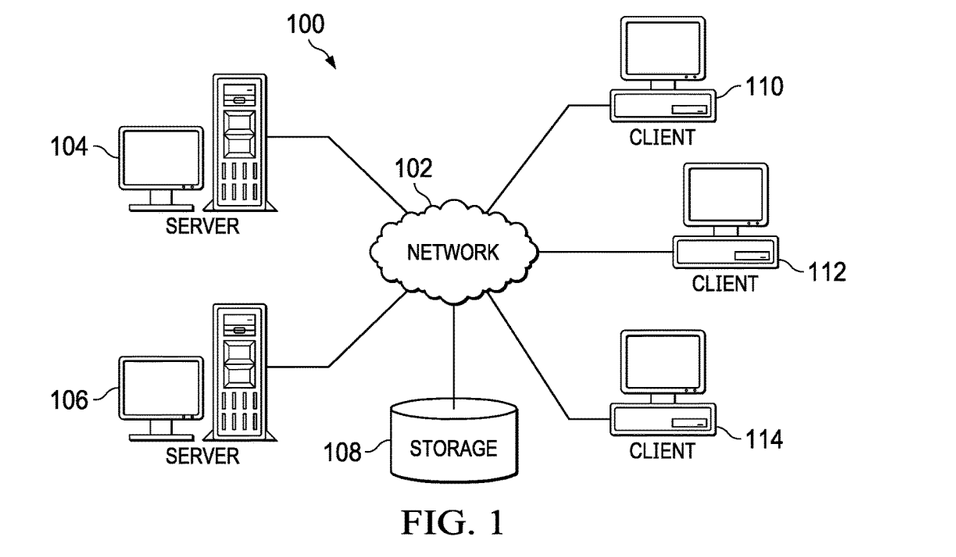
FIG. 1 depicts an exemplary block diagram of a distributed data processing environment in which exemplary aspects of the illustrative embodiments may be implemented.
Figure 2:
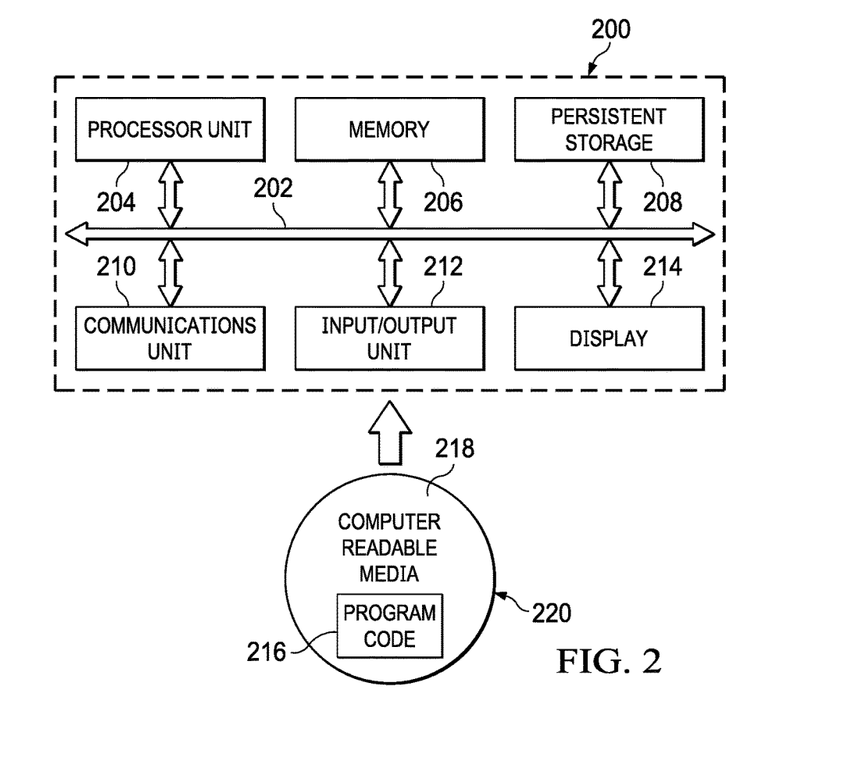
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
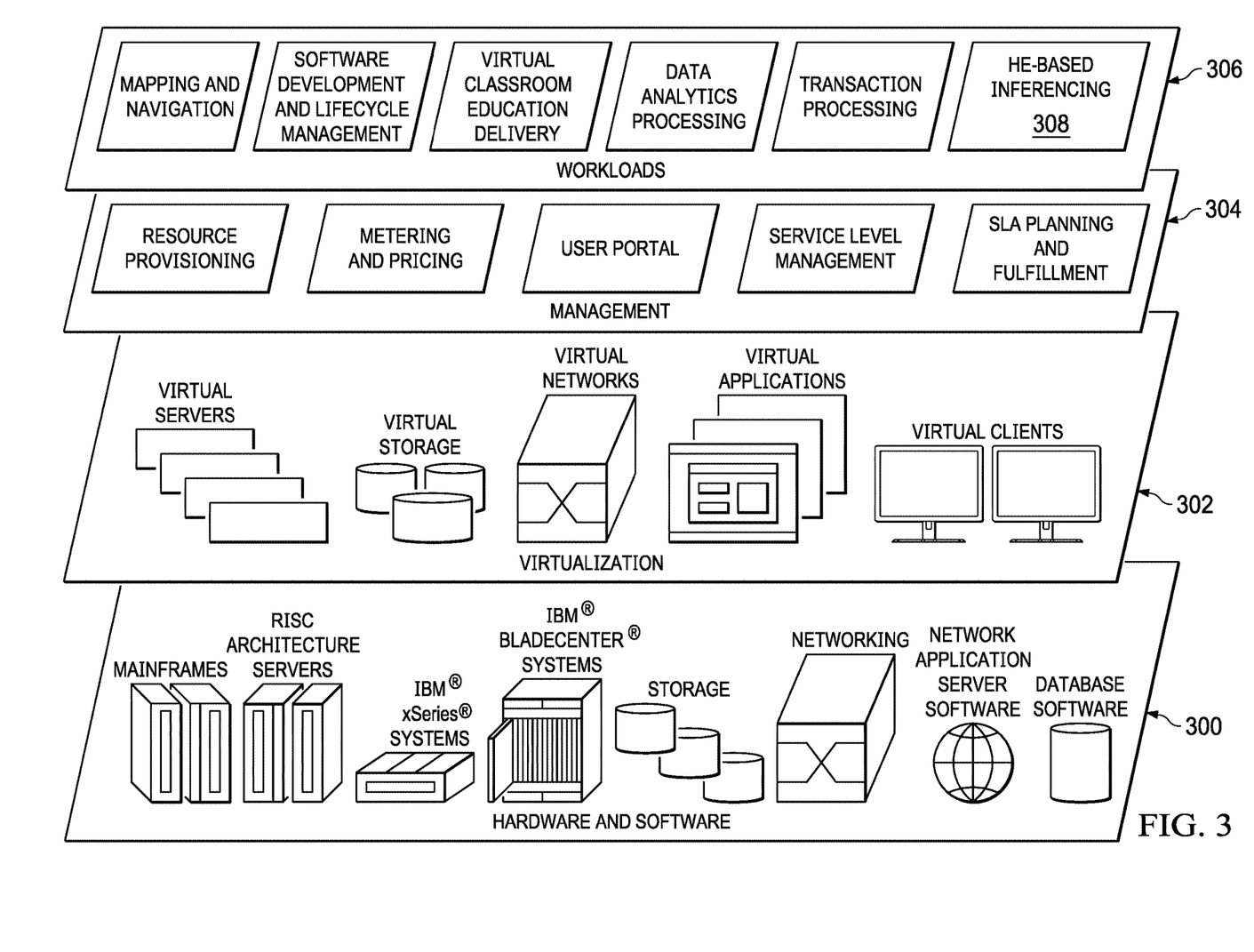
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided: Hardware and software layer 300 includes hardware and software components.

Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include the following: mapping and navigation; software development and lifecycle management; virtual classroom education delivery; data analytics processing; transaction processing; enterprise-specific functions in a private cloud; and, according to an embodiment, a technique for secure credit card fraud detection 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, New York In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers.

Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

The above-described commercial implementation is not intended to be limited, but rather is simply one representative embodiment of a client application supported in a cloud computing environment and that interacts with a cognitive service.

Homomorphic Encryption

By way of further background, Homomorphic Encryption (HE) is a form of encryption that allows computations to be carried out on ciphertext, thus generating an encrypted result which, when decrypted, matches the result of operations performed on the plaintext. A homomorphic encryption scheme is a cryptosystem that allows computations to be performed on data without decrypting it. Full Homomorphic Encryption (FHE) is often achieved by employing a somewhat homomorphic (SWHE) or leveled HE scheme in combination with a bootstrapping or re-encryption technique. The SWHE scheme is capable of supporting computations only up to a preset level of complexity determined by its parameters. This is because the ciphertexts are "noisy," and the noise keeps growing with each HE computation, and once the noise grows beyond some parameter-dependent threshold the ciphertext can no longer be decrypted. This problem may be addressed by bootstrapping, which refreshes the ciphertext and reduces its noise level, but at the cost of relying on circular security. Bootstrapping, however, is a computationally-expensive and time-consuming operation. Therefore, for practical feasibility, the number of bootstrapping operations should be kept at a minimum and possibly avoided.

Homomorphic encryption enables the construction of programs for any desirable functionality, which can be run on encrypted inputs to produce an encryption of the result. Because such a program need never decrypt its inputs, it can be run by an untrusted party without revealing its inputs and internal state. Toolkits for implementing homomorphic encryption are known. A well-known toolkit is HElib, an open-source project. The current version of HElib supports addition and multiplication operations of arbitrary numbers in binary representation, using encryption of the individual bits.

By way of further background, several FHE schemes have been proposed based on hardness of a computational problem known as Ring Learning with Errors (RLWE). Prominent examples of such schemes include BFV (Brakerski/Fan-Vercauteren), BGV (Brakerski-Gentry-Vaikuntanathan), and CKKS (Cheon-Kim-Kim-Song) schemes, which schemes (named after the original proposers) are both additively and multiplicatively homomorphic. While the BFV and BGV schemes are efficient for vector operations over integers, the CKKS scheme is more appropriate for "approximate" (limited precision) floating-point operations. Furthermore, these schemes support Single Instruction Multiple Data (SIMD) operations, in particular, by packing different plaintext values into different slots in the ciphertext. While this ciphertext packing enables parallelization of addition and multiplication operations, it is not possible to randomly access values in the individual slots of the ciphertext after packing. Rather, only limited operations, e.g., rotation of the slots within the ciphertext, are possible.

When the CKKS scheme (as implemented in the HELib library) for HE operations, real-valued features may be input to the decision tree directly, i.e., there is no requirement to transform the inputs as integers.

Machine Learning-as-a-Service Using Homomorphic Encryption

Machine Learning as a Service (MLaaS) is now a popular paradigm, where pre-trained models are hosted on a public cloud and inference is performed on a pay-per-query basis. The use of MLaaS, however, is restricted in many application domains (e.g., financial services, healthcare) because the privacy (confidentiality) of the client data on which the inference is performed is of utmost concern. Fully homomorphic encryption (FHE) can solve the above privacy conundrum by allowing certain types of computations on encrypted data without the need for decryption. As noted above, an FHE scheme can be defined as:$H=(\varepsilon, \mathcal{D}, \lambda, EVAL)$, where $\varepsilon$ and $\mathcal{D}$ represent encryption and decryption operations, respectively, $\lambda$ is the security parameter, and EVAL is the evaluate function, which takes an arbitrary function f and an encrypted input $\varepsilon(I)$ and returns the encrypted result $EVAL(f,\varepsilon(I))=\varepsilon(f(I))$. For ease of presentation, it is understood that the $\varepsilon$ and EVAL operations require access to the public key and D needs access to the private key.

Figure 4:
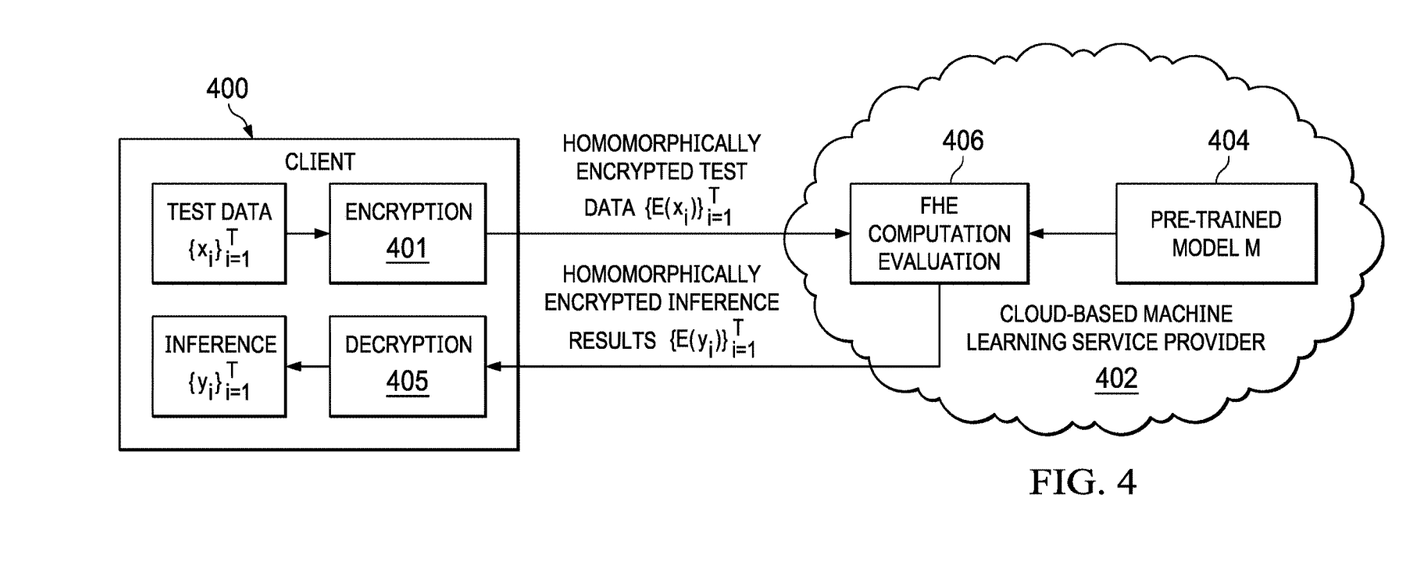
FIG. 4 depicts a Machine Learning as-a-service (MLaaS) operating environment in which the techniques of this disclosure may be implemented.

With reference now to FIG. 4, an FHE-based privacy-preserving inference scenario is depicted and works as follows. The client 400 encrypts its data x (using encryption function 401) and sends the encrypted data $\varepsilon(x)$ to the cloud-based machine learning service provider 402. The service provider, who holds a pre-trained model 404 $\mathcal{M}_\Phi$ (where $\mathcal{M}$ and $\Phi$ denote the model architecture and parameters, respectively), performs inference computation in the encrypted domain $(\varepsilon(y)=EVAL\ (\mathcal{M}_\Phi,\varepsilon(x)))$, and returns the encrypted result back to the client 400 for decryption 405. Because the service provider does not gain any knowledge about the input (x) or the resulting output (y), complete client data privacy is guaranteed. Furthermore, the above-described scenario is referred to as non-interactive because it involves only a single round of communication between the client and the service provider.

With the above as background, the technique of this disclosure is now described.

Securely Leveraging User Data for Privacy-Preserving Inferencing for High Volume Data The following describes a technique for multi-phase (e.g., two-step) inferencing in a privacy-preserving manner, with at least a first inference processing very high throughput data unencrypted, and at least a second inference then being carried out at a relatively much smaller throughput but incorporating private data (e.g., sensitive user data, encrypted using FHE) to improve the overall results. For descriptive purposes, this technique is now described in an example application, namely, fraud prediction, detection and prevention, but this example use case is not intended to be limiting. The same basic multi-phase inferencing technique is useful for any transaction processing (or other computing) system having an execution environment that ensures the integrity, availability and security of data, with fast response times and high transaction throughput.

Figure 5:
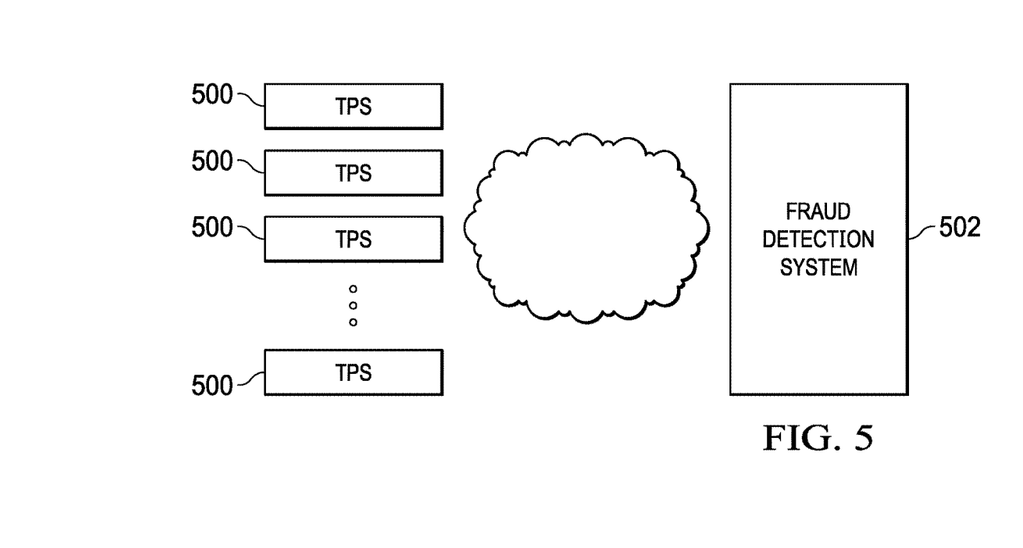
FIG. 5 depicts a representative use case involving a detection system that receives in real-time a stream of transaction data for which fraud detection is carried out.

FIG. 5 depicts an operating environment for fraud prediction, detection and prevention and in which the techniques may be practiced. As noted above, a particular use case that can benefit from the multi-phase inferencing involves credit card fraud detection, wherein the system is designed to receive and validate transaction data, preferably as the transactions themselves are occurring at the various points-of-sale/use. Thus, and as shown, numerous transaction processing systems 500 are querying a detection system 502, with a particular query being associated with one or more actual attempted credit card transactions that are occurring in real-time and that require validation (against potential fraud). In this embodiment, it is assumed that a very large of transactions (e.g., tens of thousands/second) are arriving at the detection system, and that the detection system has a service level requirement that dictates a response (e.g., "fraud" or "safe") with very low latency or perceived latency at the point-of-sale/use of the card. The detection system 502 may operate as a cloud-accessible service, such as previously described in connection with FIG. 3. As noted above, the detection system 502 may be operated in association with one or more transaction processing (or other computing) systems, or be operated as a service in connection therewith. The detection system 502 may have associated therewith other administrative, management or reporting systems, e.g., that provide notification, alerting, logging, mitigation, and the like, once a potential fraudulent transaction is flagged. The detection system may be implemented as one or more applications executing on one or more computing platforms, such as described above with respect to FIG. 2.

Figure 6:
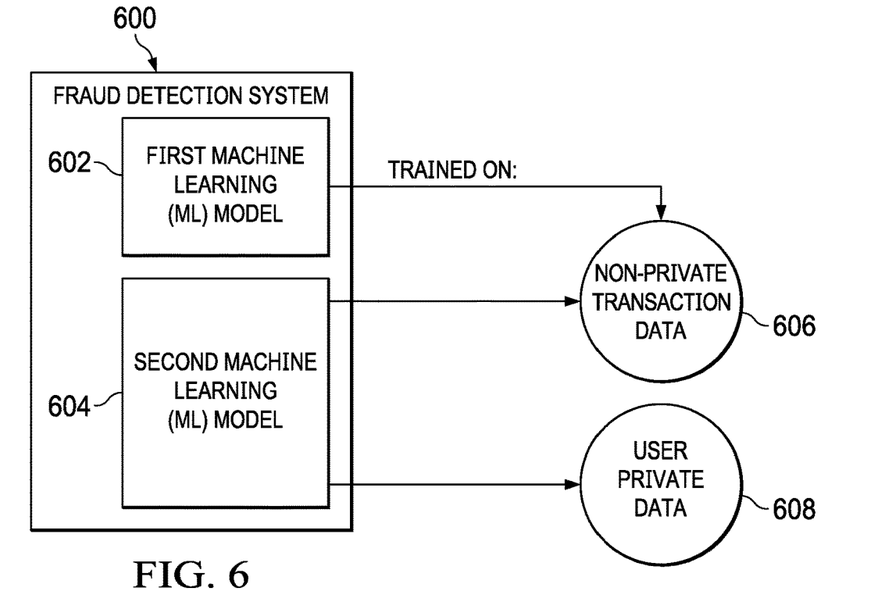
FIG. 6 depicts how first and second machine learning models are trained according to an embodiment.

As shown in FIG. 6, the detection system 600 comprises a first machine learning model 602, and a second machine learning model 604. These models are trained in a set-up (training) phase, which occurs off-line or out-of-band with respect to the actual transaction flow. Once trained, the models are then used for inferencing, preferably in real-time and against the actual transaction data that is arriving at the detection system.

As depicted in FIG. 6, in this example fraud detection use case, the first model 602 preferably is trained on a corpus of available non-private (non-sensitive) transaction data 606. Without limitation, the transaction data 606 used to train the first model 602 comprises, for each transaction, one or more of the following: user, card, year, month, day, time, amount, use chip, merchant name, merchant city, merchant state, zip, Merchant Category Code (MCC), and the like. Training of the first data model may occur in the clear. The second model 604, in contrast, is trained on such non-sensitive transaction data 606 together with private user profile data 608. The transaction data 606 used to train the second model may be the same or different transaction data as used to train the first model 602. In this example use case, only the second data model 604, however, is also trained using the private user profile data 608, which data is highly sensitive and thus needs to be secured (encrypted) at all times. Without limitation, the user profile data 608 comprises, for each user, one or more of: card brand, card type, card number, expires, CVV, has chip, cards issued, balance, credit limit, account open data, last fraudulent use, year PIN last changed, lifetime transactions, fraudulent transactions, and the like. Although the user profile data itself needs to remain encrypted, the training itself of the second data model may also occur in the clear.

Generalizing, the first ML model is trained using first training data, while typically the second ML model is trained using the first training data augmented with additional private data (e.g., private user profiles). Because only the second data model is trained using the private user data, the first and second models 602 and 604 are trained on different feature sets. Training may be repeated periodically or as new training data sets are obtained and available to the system.

Figure 7:
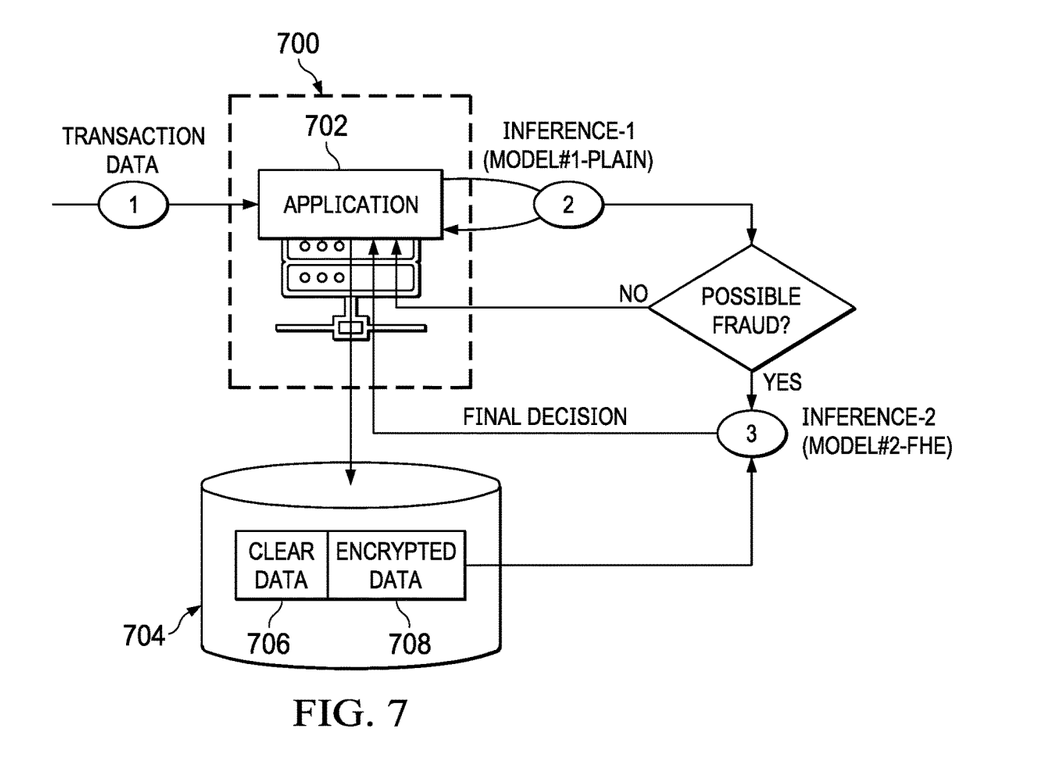
FIG. 7 depicts a two-phase inference flow that is implemented using the first and second models.

FIG. 7 depicts a two-phase inference flow that is then implemented according to this example embodiment, wherein the multi-phase inferencing approach is used for credit card fraud detection. In this embodiment, a computing system 700 hosts application 702 that provides the fraud detection, and the computing system 700 has associated therewith a database 704 of the non-private transaction data 706, and the private user data 708. Typically, the database 704 that stores the private user data 706 may be hosted on other servers, even those in potentially untrusted environments. As depicted, the transaction data (from the transaction processing systems, not shown) arrives at step (1), preferably in real-time. The basic fraud detection operation, which here is carried out on a transaction-by-transaction basis, uses the first model at step (2) to determine whether a possible fraud exists. If not, the application 702 takes no action. If, however, the outcome of the "possible fraud?" test is positive, control moves to step (3), by which the application 702 applies fully homomorphic encryption (FHE)-based inferencing against additional encrypted data 708 stored in the database 704 to make a final decision on whether the transaction should be tagged as fraudulent. The FHE techniques described in FIG. 4 above may be used for this purpose.

More formally, and once again with reference to FIG. 7, at step (1) transaction $T_i$ arrives. At step (2), the application 702 applies the first model $M_{i1}$ on $T_i$→the first inference regarding possible fraud. At step (3), and if $M_{i1}(T_i)$=FRAUD, control continues to step (4). At this step, the application 702 queries encrypted user data $U_i$ for the transaction $T_i$, where $U_i$ is the user data and $T_i$ is the transaction data. The second model $M_2$ is applied on $T_i+U_i$→FHE inference on $M_2$. If $M_2(T_i+U_1)$=FRAUD, the application reports fraud and processing is completed.

The above-described two-phase inference flow provides significant advantages, as it enables the application to apply inferencing, e.g., FHE directly and using a high-accuracy model (trained on both transaction and private user data), even with respect to high volume transaction data arriving in real-time and with respect to data stored in encrypted form on potentially untrusted environments. In a representative example operating scenario, the application models are trained and the inferencing support provided in an deep learning platform, such as IBM® Watson® Machine Learning Accelerator (WML). Transactions are assumed to be flowing in to the system at a high rate (e.g., 30-60,000 per second). In a typical scenario of this type, only a small percentage of the transactions (e.g., about 100 TPS) are labeled as potentially fraudulent. Thus, FHE inferencing only needs to handle a workload of this magnitude. This workload is feasible using existing FHE models (e.g., logistic or linear regression) and multi-threaded resources.

Generalizing, one skilled in the art will appreciate that there are many other types of use cases that can benefit from the two-phase inferencing wherein a first model that is trained on non-private data is used in a first level determination that identifies a relatively small subset of suspect data, which subset is then further inference (preferably homomorphically) to provide the final, second level detection decision. Stated another way, the first phase inferencing provides a coarse level detection, while the second phase inferencing provides a fine-grained decision. This two-level approach provides significant processing advantages, as it is expected that the number of transactions that are expected to pass through the first level filter are relatively small in number (or percentage); thus, the actual resources that are needed for the much more computationally-intensive homomorphic inference are limited. Thus, the overall resource consumption of the system as a whole is reduced, even as the transaction volume may increase.

Other example techniques that may benefit from this privacy-preserving inferencing approach include, without limitation, online reservation and ordering systems, logging systems, database and information management systems, intrusion and anomaly detection systems, identity and access management systems, cybersecurity systems, and other cloud-based systems, and others. There is no limitation on potential use cases, as the technique may be used to support any application or service that receives and processes high volume data while complying with privacy regulations, compliance or other security requirements. Many new industry applications may use this type of cloud-based detection service and thus provide enhanced privacy guarantees. Other examples are healthcare, banking, finance, marketing and finance, where compliance with respect to client privacy is paramount or otherwise required. More generally, the approach may be used for any application that involves scoring or inferencing private data.

Efficiently Batching Pre-Encrypted Data for Homomorphic Inferencing

While the above-described technique provides for significant data throughput (through the fraud detection system), the following section describes several additional techniques that enable even higher throughputs to be realized. Continuing with the non-limiting example scenario, namely, credit card fraud detection, assume now that the first level detection process has been carried out and that transactions that are likely fraudulent have been identified. Instead of performing homomorphic inferencing on each such transaction on a transaction-by-transaction basis (e.g., using step (3) in FIG. 7), a batch-based approach is used, as is now described. In particular, it is assumed that a set of transactions have been identified as potentially fraudulent, and each such transaction must now be further checked using the user profile and other sensitive information (such as personal information and credit card information) that is/are stored in encrypted form, typically in row-wise fashion. This user profile and other sensitive information corresponds to user private data 708 in FIG. 7. In general, a particular user (corresponding to a user identifier in the non-private data 706) has associated therewith an encrypted record 708. The raw data record (i.e., before encryption is applied) typically has a large set of data fields that have data values that are filled in off-line, e.g., when the user obtains the credit card, when user account information is updated, etc. Some of these data fields may be empty. According to a feature of this disclosure, and as will be described, batch processing is carried out with respect to some defined subset of the overall set of data fields that comprise the data record, and this defined subset is referred to herein as a "private data portion of interest." Each data record in the database (both before and after encryption) has a common structure (size, number of fields, initial position of the private data portion of interest, etc.) As will be seen, a basic goal of the techniques described below is to alter the particular location of the private data portion across a number of encrypted data records such that these encrypted data records can be batched together into a single encrypted data record that includes all of the private data portion(s) from the individual records. For fraud detection, the data values in the private data portion(s) of interest in the single encrypted data record are then checked against corresponding real-time transaction data using homomorphic inferencing to ensure privacy of those data values.

Figure 8:
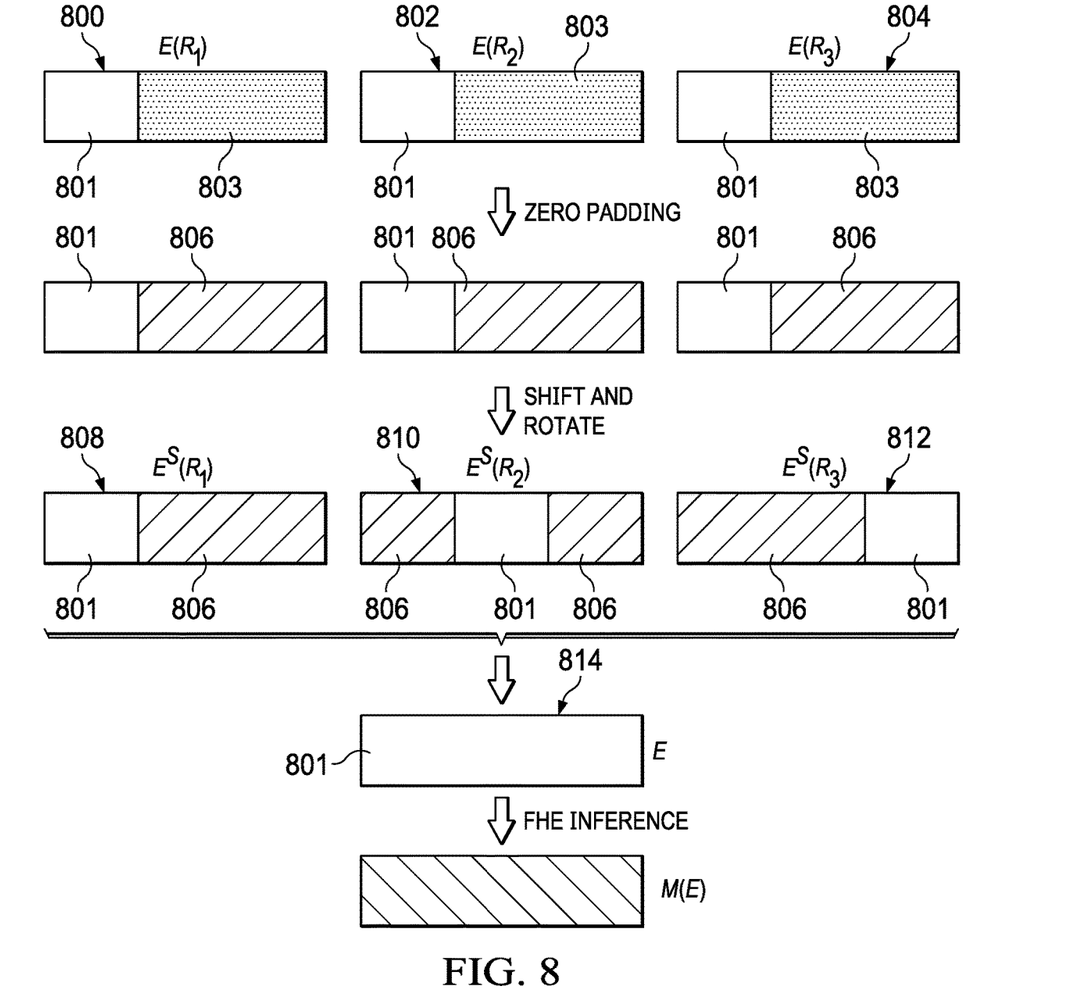
FIG. 8 depicts a first embodiment of a technique of this disclosure that enables efficient and secure, batched real-time inference on pre-encrypted data sets, e.g., encrypted user profiles evaluated for fraud detection.

FIG. 8 depicts a first embodiment of this disclosure, which provides for efficient (near) real-time shift and batch on encrypted data. In this particular use case, and as noted above, this operation preferably occurs entirely at runtime and (in the example use case) after a set of transactions have been identified by the fraud detection workflow depicted in FIG. 7 as being potentially fraudulent. In lieu of performing HE-based inferencing on each transaction (one at a time), the following batching technique is used. In this embodiment, a batching time window of size W is fixed, and $f$ denotes a number of data fields corresponding to the private data portion of interest within a given encrypted data record and that are to be examined.

The routine begins by collecting transactions $\mathcal{T}$ arriving within the batching time window W. As noted, in this example use case, these transactions are those already considered to be potentially fraudulent. The database of encrypted records is queried, and all the encrypted records corresponding to $\mathcal{T}$ from the database are obtained (e.g., using the user identifiers in the non-private data 706). FIG. 8 depicts three (3) such encrypted records 800, 802 and 804, or more generally, denoted by $E(R_1), E(R_2), \ldots E(R_N)$. As shown in the upper portion of FIG. 8, each encrypted data record has the same format (size, number of data fields, initial position of those data fields, etc.). Thus, and as noted above, before the following described processing herein is initiated, each private data portion of interest is in the same position (in each encrypted data record). These records comprise an INPUT, as depicted in the batching algorithm 900 for this embodiment shown in FIG. 9. As can be seen, each of the encrypted records has a first portion 801 corresponding to private data portion of interest for the homomorphic inferencing, and a second portion 803, which includes data fields that are not being used for whatever reason (relevance, computational efficiency, etc.). Then, and for each $i \in [N]$, the following transformations are then performed on the $i^{th}$ record: multiply $E(R_1)$ by the vector 1 ... $f$ times ... 100 ... 0 to ensure all the entries in the record corresponding to the features of interest except those corresponding to the record $R_i$ are zeros. This zero padding 806 is depicted in FIG. 8 for each of the records 800, 802 and 804. Then, and as depicted in the algorithm, the $i^{th}$ record $E(R_i)$ is rotated by a factor $f \cdot i$, i.e., $E^s(RD \leftarrow \text{shiftRotate}(E(R_i), f \cdot i)$. The result of the shift and rotate function is a transformed encrypted data record (corresponding to each of the encrypted records), as depicted in FIG. 8. Thus, encrypted data record 800 is transformed to transformed encrypted data record 808, encrypted data record 802 is transformed to transformed encrypted data record 810, and encrypted data record 804 is transformed to transformed encrypted data record 812. As can be seen, and based on the transformations, the transformed encrypted data records have the private data portion of interest at a unique (and non-overlapping) position. To complete the process, all of the transformed encrypted data records 808, 810 and 812 are then added together: $E \leftarrow E_{i \in [N]} E^S(R_i)$, creating the batch encrypted data record 814, which corresponds to the OUTPUT in the algorithm. As depicted, the batch encrypted data record 814 includes the private data portion(s) that were located originally in the individual encrypted data records 800, 802 and 804. The FHE inferencing $\mathcal{M}$ (E) is then performed on the batch encrypted record 814. In response to the homomorphic inferencing, one or more of the set of transactions are identified as having a given characteristic, e.g., fraudulent. This completes the processing.

Figure 9:
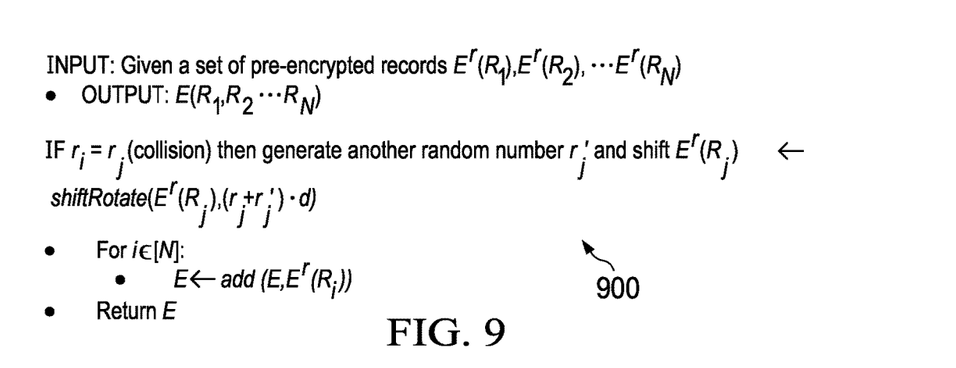
FIG. 9 is an algorithm that implements the first batching embodiment, as shown in FIG. 8.

Formally, the algorithm 900 in FIG. 9 depicts the first embodiment for efficient encrypted data record batching according to this disclosure. This batch processing operates on an INPUT that is a set of pre-encrypted records $E(R_1), E(R_2), \ldots E(R_N)$, and it generates an OUTPUT $E(R_1, R_2 \ldots R_N)$ using a shift rotate function, as shown. The homomorphic encryption is then performed on the OUTPUT.

Figure 10:
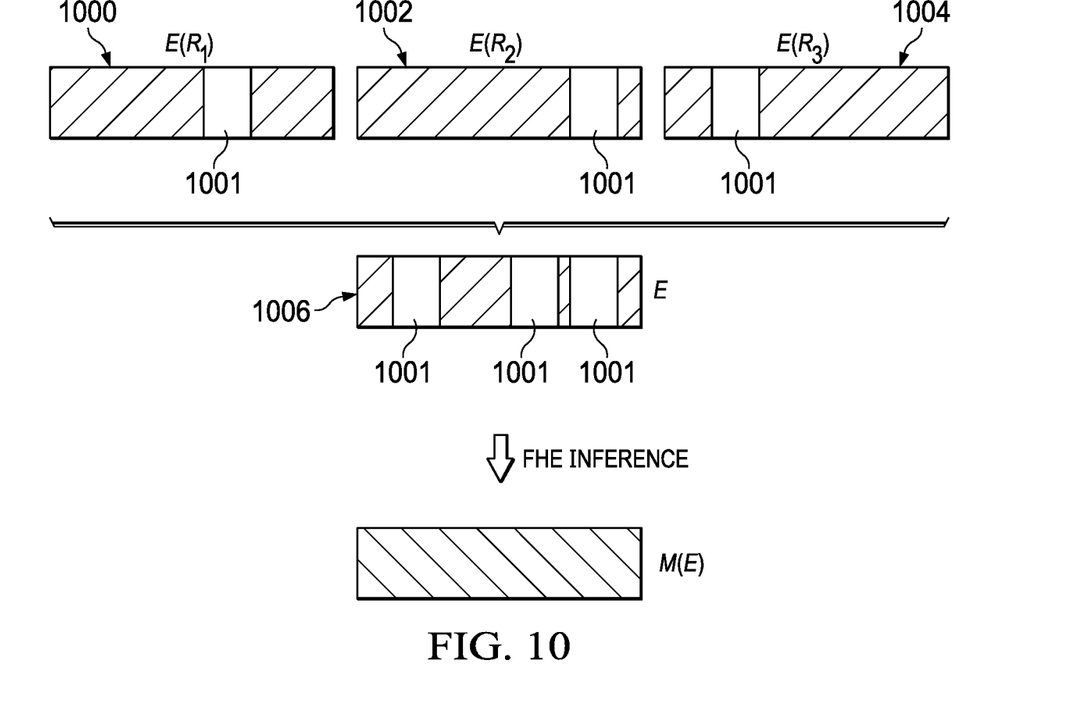
FIG. 10 depicts a second embodiment of a technique of this disclosure.
Figure 11:
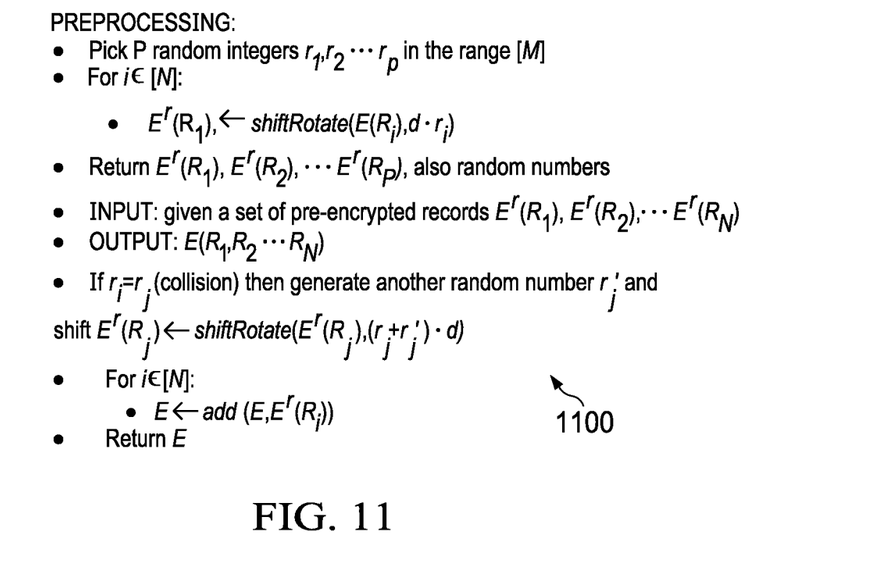
FIG. 11 depicts an algorithm that implements the second embodiment depicted in FIG. 10.

FIG. 10 depicts a second embodiment, which is sometimes referred to herein as randomized shift at storage/encrypt time, and an associated algorithm 1100 for this embodiment is shown in FIG. 11. In this second embodiment, and in contrast to the first embodiment, not all processing occurs at runtime; rather, there are two (2) phases, a first phase that is carried out with respect to raw data records that are "at rest," i.e., stored (or being stored) in a database or the like, and a second phase that is carried out at runtime with respect to transactions that have been identified for inferencing using the stored encrypted data records. The first phase occurs off-line. During this phase, raw data records at rest are transformed in the manner that is now described.

In particular, let M denote a number of slots in the FHE context. As described in the algorithm 1100, for each data record in the database R, a random integer $r(R) \in [0, N-1]$ is generated. For each of these records, pre-processing includes shift-rotating record R by r(R), and then encrypting the record to obtain E(R). Thus, in this embodiment, the shift-rotate operation happens on the raw data—thereby theoretically altering the position of the private data portion of interest—after which the data record is encrypted. These records and the values (r, E(R)) are stored back into the database, and this completes the off-line phase.

Online (runtime) inferencing then proceeds as follows. As in the first embodiment, a batching time window of size W is fixed, a number of features (corresponding to the private data portion of interest) is denoted by $f$, and the transactions T arriving within that given time window W are then collected. The database (which in this embodiment includes the encrypted data records processed as described above) is queried, and all the relevant encrypted data records and their random shift corresponding to $\mathcal{T}$, are then obtained. In the example shown FIG. 10, this runtime operation returns the three (3) records 1000, 1002 and 1004, each of which as a result of the pre-processing already includes the private data portion of interest 1001 (that will be examined during the homomorphic inferencing on the batch record. More formally, this operation obtains the following INPUT: $(r(R_1), E(R_1)), (r(R_2), E(R_2)), \ldots (r(R_N)(E(R_N))$. Because of the random (as opposed to deterministic approach in the first embodiment) shifting used during pre-processing, there is a possibility that the encrypted data records may have overlapping (and thus colliding) portions 1001. If there are any collisions between some $r(R_i)=r(R_j)$, then $E(R_j)$ is shifted to a free space. Once any collisions are identified and resolved, the batch processing continues as in the first embodiment. In particular, the resulting encrypted records are added together: $E \leftarrow \Sigma_{i \in [N]} E^S(R_i)$, creating the batch encrypted data record 1006 that is the OUTPUT. As in the first embodiment, the batch encrypted data record includes all of the private data portion(s) initially found in the records 1000, 1002 and 1004. The FHE inferencing $\mathcal{M}$ (E) is then performed on the batch encrypted data record 1006, as described above. This completes the processing.

Formally, the algorithm 1100 in FIG. 11 depicts the second embodiment for efficient batching according to this disclosure. In this embodiment, and as was described above, pre-processing involves picking random integers and performing the shift-rotate on raw data, and then encrypting the data record, to generate the INPUT, in this case a set of pre-encrypted records $E^r(R_1), E^r(R_2), \ldots E^r(R_N)$, and this algorithm generates the OUTPUT $E(R_1, R_2 \ldots R_N)$ on which the homomorphic inferencing is then performed. In both cases, multiple encrypted data records are combined (batched or pooled) together into the single record against which inferencing is then carried out.

The first and second embodiments typically are independent from one another, but this is not a limitation. By batching transactions together, (and in this near real-time manner), runtime computationally efficiency is significantly increased, thereby significantly increasing the throughput of the detection system as a whole. Moreover, one of ordinary skill in the art will appreciate that the shift/add methods described above facilitate efficient batching are useful in any use case in which pre-encrypted databases or data sets are used.

As described, typically a computing system that implements this approach is implemented in software, e.g., as a set of computer program instructions executed by one or more hardware processors. A particular tool or component in the system may comprise any number of programs, processes, execution threads, and the like, together with appropriate interfaces and databases to support data used or created by the tool or component. The tool or component may be configured or administered with a web-based front-end, via a command line, or the like. The tool or component may include one or more functions that are implemented programmatically, or that interoperate with other computing entities or software systems via an application programming interface (API), or any convenient request-response protocol.

Any references herein to one or more commercial products or services are exemplary and should not be taken to limit the disclosed technique, which may be implemented on any system, device, appliance (or, more generally, machine) having the general characteristics and operating functionality that has been described.

As noted, one preferred implementation of this subject matter is as-a-service, but this is not a limitation either. The HE-based inferencing portion of the technique may be carried out entirely on-premises or in a standalone operating environment. As previously noted, and without limitation, the subject matter may be implemented within or in association with a cloud deployment platform system or appliance, or using any other type of deployment systems, products, devices, programs or processes. Further, the model building or inferencing system functionality may be provided as a standalone function, or it may leverage functionality from other products and services.

A representative cloud application platform with which the technique may be implemented includes, without limitation, any cloud-supported application framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The tool and response functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the sensitive data detection service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Further, FHE is just a representative cryptographic protocol, and it is not intended to be limited. Moreover, while the second phase inferencing preferably occurs using an FHE protocol, the approach herein may be leveraged with other multi-party secure computation techniques that do not require decryption of the user (or other) sensitive data. Alternatives to FHE include, e.g., security enclave-based cryptography, quantum-safe encryption, Yao garbled circuits, and others.

The techniques herein provide for improvements to another technology or technical field, namely, fraud detection systems, and cloud-based detection systems that incorporate or expose such technologies.

The particular use case or application for which the framework is being used in not a limitation of this disclosure.

While the above-described scheme typically uses two phases, this is not a limitation, as additional (and hierarchical) levels of discrimination may be implemented.

Having described the subject matter, what is claimed is as follows:

1. A computer-implemented method comprising:
    for a set of transactions that have been identified in real-time during a time window, and for each transaction in the set, obtaining an encrypted data record, the encrypted data record having a private data portion of interest, wherein the private data portion of interest for each encrypted data record is at a same position;
    applying one or more transformations to each of the encrypted data records to generate a set of transformed encrypted data records each having the private data portion of interest at a unique position as compared to other transformed encrypted data records of the set;

adding the transformed encrypted data records to generate a single batched encrypted data record, wherein the single batched encrypted data record includes the private data portions of interest from each of the transformed encrypted data records;
performing homomorphic inferencing on the batched encrypted data record; and
responsive to the homomorphic inferencing, identifying one or more of the set of transactions as having a given characteristic.

2. The method as described in claim 1 wherein applying the one or more transformations comprises:
zero padding all portions of the encrypted data record other than the portion corresponding to the private data portion of interest; and
for each encrypted data record other than a first encrypted data record:
incrementally applying, in real-time, a shift-rotate function to position the private data portion of interest at the unique position.

3. The method as described in claim 1 wherein the set of transactions are transactions that have been flagged for evaluation from a stream of real-time transaction data.

4. A computer system comprising:
one or more computer processors, one or more computer readable storage media, and program instructions collectively stored on the one or more computer readable storage media for execution by at least one of the one or more computer processors, the program instructions comprising:
program instructions to, for a set of transactions that have been identified in real-time during a time window, and for each transaction in the set, obtain an encrypted data record, the encrypted data record having a private data portion of interest, wherein the private data portion of interest for each encrypted data record is at a same position;
program instructions to apply one or more transformations to each of the encrypted data records to generate a set of transformed encrypted data records each having the private data portion of interest at a unique position as compared to other transformed encrypted data records of the set;
program instructions to add the transformed encrypted data records to generate a single batched encrypted data record, wherein the single batched encrypted data record includes the private data portions of interest from each of the transformed encrypted data records;
program instructions to perform homomorphic inferencing on the batched encrypted data record; and
program instructions to, responsive to the homomorphic inferencing, identify one or more of the set of transactions as having a given characteristic.

5. The computer system as described in claim 4 wherein the program instructions to apply the one or more transformations comprise:
program instructions to zero pad all portions of the encrypted data record other than the portion corresponding to the private data portion of interest; and
program instructions to, for each encrypted data record other than a first encrypted data record:
incrementally apply, in real-time, a shift-rotate function to position the private data portion of interest at the unique position.

6. The computer system as described in claim 4 wherein the set of transactions are transactions that have been flagged for evaluation from a stream of real-time transaction data.

7. A computer program product comprising:
one or more computer readable media, and program instructions collectively stored on the one or more computer readable storage media, the program instructions comprising:
program instructions to, for a set of transactions that have been identified in real-time during a time window, and for each transaction in the set, obtain an encrypted data record, the encrypted data record having a private data portion of interest, wherein the private data portion of interest for each encrypted data record is at a same position;
program instructions to apply one or more transformations to each of the encrypted data records to generate a set of transformed encrypted data records each having the private data portion of interest at a unique position as compared to other transformed encrypted data records of the set;
program instructions to add the transformed encrypted data records to generate a single batched encrypted data record, wherein the single batched encrypted data record includes the private data portions of interest from each of the transformed encrypted data records;
program instructions to perform homomorphic inferencing on the batched encrypted data record; and
program instructions to, responsive to the homomorphic inferencing, identify one or more of the set of transactions as having a given characteristic.

8. The computer program product as described in claim 7 wherein the program instructions to apply the one or more transformations comprise:
program instructions to zero pad all portions of the encrypted data record other than the portion corresponding to the private data portion of interest; and
program instructions to, for each encrypted data record other than a first encrypted data record:
incrementally apply, in real-time, a shift-rotate function to position the private data portion of interest at the unique position.

9. The computer program product as described in claim 7 wherein the set of transactions are transactions that have been flagged for evaluation from a stream of real-time transaction data.

* * * * *